(12) United States Patent
Yoshinari et al.

(10) Patent No.: US 7,597,843 B2
(45) Date of Patent: Oct. 6, 2009

(54) NICKEL BASED SUPERALLOYS WITH EXCELLENT MECHANICAL STRENGTH, CORROSION RESISTANCE AND OXIDATION RESISTANCE

(75) Inventors: Akira Yoshinari, Hitachinaka (JP); Ryokichi Hashizume, Kitakatsuragi (JP); Masahiko Morinaga, of 10-28, Marunouchi 2-chome, Naka-ku, Nagoya-shi, Aichi 460-0002 (JP); Yoshinori Murata, of 22, Sonoyama-cho 2-chome, Chikusa-ku, Nagoya-shi, Aichi 464-0812 (JP)

(73) Assignees: Hitachi, Ltd., Tokyo (JP); The Kansai Electric Power Co., Inc., Osaka (JP); Masahiko Morinaga, Aichi (JP); Yoshinori Murata, Aichi (JP)

( * ) Notice: Subject to any disclaimer, the term of this patent is extended or adjusted under 35 U.S.C. 154(b) by 56 days.

(21) Appl. No.: 11/212,644

(22) Filed: Aug. 29, 2005

(65) Prior Publication Data

US 2007/0235110 A1 Oct. 11, 2007

(30) Foreign Application Priority Data

Sep. 17, 2004 (JP) ............................. 2004-271168

(51) Int. Cl.
*C22C 19/05* (2006.01)
(52) U.S. Cl. ..................... 420/448; 420/449; 420/450; 420/451; 420/460
(58) Field of Classification Search ................. 420/442, 420/448–451, 460
See application file for complete search history.

(56) References Cited

U.S. PATENT DOCUMENTS

| 4,935,072 | A | * | 6/1990 | Nguyen-Dinh | ............... 148/562 |
|---|---|---|---|---|---|
| 5,151,249 | A | * | 9/1992 | Austin et al. | ................. 420/445 |
| 5,366,695 | A | | 11/1994 | Erickson | |
| 5,455,120 | A | | 10/1995 | Walston et al. | |
| 5,482,789 | A | * | 1/1996 | O'Hara et al. | ............... 428/652 |
| 6,007,645 | A | | 12/1999 | Cetel et al. | |
| 6,444,057 | B1 | * | 9/2002 | Darolia et al. | .............. 148/428 |
| 6,648,596 | B1 | * | 11/2003 | Grylls et al. | ................. 415/200 |
| 7,115,175 | B2 | * | 10/2006 | DeLuca et al. | .............. 148/556 |
| 2002/0172808 | A1 | * | 11/2002 | Wustman et al. | ............ 428/195 |
| 2007/0163682 | A1 | * | 7/2007 | Tamaki et al. | ................ 148/428 |

FOREIGN PATENT DOCUMENTS

| EP | 0663462 A1 | 7/1995 |
|---|---|---|
| JP | 10-195565 | 7/1998 |

OTHER PUBLICATIONS

Zheng et al., "Effect of RU Addition on Cast Nickel Base Superalloy with Low Content of CR and High Content of W" Superalloys 2000, pp. 305-311, The Minerals, Metals & Materials Society.

* cited by examiner

*Primary Examiner*—George Wyszomierski
*Assistant Examiner*—Tima M McGuthry-Banks
(74) *Attorney, Agent, or Firm*—Dickstein Shapiro LLP

(57) ABSTRACT

Nickel based superalloys with excellent mechanical strength, corrosion resistance and oxidation resistance, which consist essentially of chromium in an amount of 3 to 7% by weight, cobalt in an amount of 3 to 15% by weight, tungsten in an amount of 4.5 to 8% by weight, rhenium in an amount of 3.3 to 6% by weight, tantalum in an amount of 4 to 8% by weight, titanium in an amount of 0.8 to 2% by weight, aluminum in an amount of 4.5 to 6.5% by weight, ruthenium in an amount of 0.1 to 6%, hafnium in an amount of 0.01 to 0.2% by weight, molybdenum in an amount of less than 0.5% by weight, carbon in an amount 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel.

11 Claims, No Drawings

NICKEL BASED SUPERALLOYS WITH EXCELLENT MECHANICAL STRENGTH, CORROSION RESISTANCE AND OXIDATION RESISTANCE

CLAIM OF PRIORITY

This application claims priority from Japanese application serial No. 2004-271168, filed on Sep. 17, 2004, the content of which is hereby incorporated by reference into this application.

FIELD OF THE INVENTION

The present invention relates to nickel based superalloys suitable for materials for parts and products that require mechanical strength, toughness, corrosion resistance and oxidation resistance at high temperatures.

RELATED ART

Recently, in power plants such as jet engines, gas turbines, etc, elevation of temperature at the turbine inlet is essential for high performance and high efficiency of the plants; development of turbine blade materials that satisfy the above elevation of temperatures.

Primary characteristics required for the turbine blade materials that withstand high temperatures are creep rupture strength, toughness for sustaining centrifugal force at high temperatures and oxidation resistance and corrosion resistance for sustaining high temperature combustion gas atmosphere. In order to meet the required properties, single crystal superalloys disclosed in such as Japanese patent laid-open 10-195565 are considered promising and are now in a practical use stage.

Nickel based single crystal superalloys differ from the conventional casting alloys (equi-axis crystal) or unidirectional columnar crystal alloys in-being free of grain boundaries grains; the single crystal materials can be subjected to solution treatment at a temperature immediately lower than the melting point of the materials. As a result, it is possible to obtain a homogeneous structure that is completely freed from solidification segregation. The resulting alloys have extremely higher creep rupture strength and toughness than do the conventional casting alloys. Further, the solid solution treatment at high temperatures makes it possible to add strengthening elements in amounts larger than in the conventional casting alloys. The creep rupture strength of the alloys can be improved by the addition of tungsten, tantalum, etc, which have a function for solid-solution strengthening to the alloys.

The conventional nickel based superalloys have generally been developed mainly for aiming at improving of creep rupture strength at high temperatures; however, other properties such as corrosion resistance at high temperatures have not sufficiently been investigated.

In order to improve corrosion resistance of the nickel base superalloys, addition of a large amount of chromium and rhenium is most effective. However, if a large amount of chromium is added, a solubility limit of tantalum and tungsten, which are excellent in solid solution strengthening is lowered, thereby to fail improvement of creep rupture strength. On the other hand, if an additional amount of rhenium is increased, oxidation resistance at high temperatures is remarkably lowered, though mechanical strength and corrosion resistance are improved. From the above reasons, there are no alloys that satisfy the mechanical strength, corrosion resistance and oxidation resistance at high temperatures, as a matter of fact.

SUMMARY OF THE INVENTION

It is an object of the present invention to provide single crystal nickel based superalloys that can be improved in its oxidation resistance and corrosion resistance at high temperatures without sacrificing the creep rupture strength at high temperatures.

The present invention provides nickel based superalloys with excellent mechanical strength, corrosion resistance and oxidation resistance, which consist essentially of chromium in an amount of 3 to 7% by weight, cobalt in an amount of 3 to 15% by weight, tungsten in an amount of 4.5 to 8% by weight, rhenium in an amount of 3.3 to 6% by weight, tantalum in an amount of 4 to 8% by weight, titanium in an amount of 0.8 to 2% by weight, aluminum in an amount of 4.5 to 6.5% by weight, ruthenium in an amount of 0.1 to 6%, hafnium in an amount of 0.01 to 0.2% by weight, molybdenum in an amount of less than 0.5% by weight, carbon in an amount 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel.

A preferable composition of the alloy consists essentially of chromium in an amount of 3.5 to 7% by weight, cobalt in an amount of 10.1 to 13.5% by weight, tungsten in an amount of 4.5 to 8% by weight, rhenium in an amount of 3.3 to 5.5% by weight, tantalum in an amount of 6.1 to 8% by weight, titanium in an amount of 1 to 2% by weight, aluminum in an amount of 4.5 to 6.5% by weight, ruthenium in an amount of 0.1 to 6% by weight, hafnium in an amount of 0.03 to 0.15% by weight, molybdenum in an amount of less than 0.5% by weight, carbon in an amount 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel.

A more preferable composition of the alloy consists essentially of chromium in an amount of 3.8 to 6.8% by weight, cobalt in an amount of 10.1 to 12.5% by weight, tungsten in an amount of 4.8 to 7% by weight, rhenium in an amount of 3.3 to 5.2% by weight, tantalum in an amount of 6.1 to 8% by weight, titanium in an amount of 1.2 to 1.8% by weight, aluminum in an amount of 4.5 to 6.5% by weight, ruthenium in an amount of 0.1 to 6% by weight, hafnium in an amount of 0.03 to 0.15% by weight, molybdenum in an amount of less than 0.5% by weight, carbon in an amount 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel.

A particularly preferable composition of the alloy consists essentially of chromium in an amount of 3.8 to 6.8% by weight, cobalt in an amount of 10.1 to 12.5% by weight, tungsten in an amount of 4.8 to 7% by weight, rhenium in an amount of 3.3 to 5.2% by weight, tantalum in an amount of 6.1 to 8% by weight, titanium in an amount of 1.2 to 1.8% by weight, aluminum in an amount of 4.5 to 6.5% by weight, ruthenium in an amount of 0.1 to 6% by weight, hafnium in an amount of 0.03 to 0.15% by weight, molybdenum in an amount of less than 0.1% by weight, carbon in an amount 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel.

The most preferable composition of the alloy consists essentially of chromium in an amount of 3.8 to 6.8% by weight, cobalt in an amount of 10.1 to 12.5% by weight, tungsten in an amount of 4.8 to 7% by weight, rhenium in an amount of 3.3 to 5.2% by weight, tantalum in an amount of 6.1 to 8% by weight, titanium in an amount of 1.2 to 1.8% by weight, aluminum in an amount of 4.5 to 6.5% by weight, ruthenium in an amount of 0.2 to 4% by weight, hafnium in an amount of 0.03 to 0.15% by weight, molybdenum in an amount of less than 0.1% by weight, carbon in an amount 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel.

The nickel based superalloys of the present invention may contain a rare earth element in 0.1 to 100 ppm, which further improves corrosion resistance and oxidation resistance. Preferable rare earth elements are yttrium and cerium.

The present invention presents compositions of nickel based superalloys in the state of ingots, i.e. a material for products or parts that are used at high temperatures. The alloys of the present invention are cast mainly as a single crystal. After casting, the alloys are subjected to a heat treatment comprising the solution treatment and aging treatment, in general.

Next, the reasons of limitation of the elements will be explained in the following. The inevitable impurities in the alloys of the present invention are elements brought into the alloys such as silicon, manganese, phosphor, sulfur, etc.

[Cr: 3 to 7%]

Cr is an element useful for improving corrosion resistance of the alloys at high temperatures. When the amount of Cr is 3% or more, the effect of addition will be remarkable. As the amount of Cr increases, the effect of the addition increases; however, if the amount becomes excessive, it lowers the solubility limit of the strengthening element and TCP phase precipitates to harm high temperature strength and high temperature corrosion resistance. Accordingly, the upper limit is 7%. In this range. of the addition, a preferable amount of Cr is within a range of 3.5 to 7%.

[Co: 3 to 15%]

Co is an element to make it easy to conduct the solution treatment by lowering the solid solution temperature of the γ' phase (an inter-metallic compound of Ni and Al, $Ni_3Al$) and to strengthen the γ phase by solid solution and improve high temperature corrosion resistance. These effects may appear if the additive amount becomes 3% or more. On the other hand, if an amount of Co exceeds 15%, the precipitation of the γ' phase as a precipitation strengthening phase is suppressed, resulting in lowering the mechanical strength at high temperatures. In considering the balance between the easiness of solution treatment and mechanical strength, a preferable amount of Co is 10.1 to 13.5%, and more preferably 10.1 to 12.5%.

[W: 4.5 to 8%]

W is an element dissolvable in the γ' phase as well as the γ phase which is the matrix of the alloy; W is effective for increasing the creep rupture strength by solid solution strengthening. In order to obtain the effect mentioned-above sufficiently, at least 4.5% is needed. However, since W has a large specific gravity, it increases the specific gravity of the alloys and it lowers corrosion resistance. If the amount exceeds 8%, needle like a-W precipitates to lower the creep rupture strength and corrosion resistance and toughness at high temperatures. Thus, the upper limit is 8%. In the above composition, a preferable additive amount is 4.8 to 7% in considering the balance among high temperature mechanical strength, corrosion resistance and structure stability at high temperatures.

[Re: 3.5 to 6%]

Re dissolves almost completely in the γ phase matrix whereby it strengthens creep rupture strength by solid solution strengthening and it effectively improves corrosion resistance. In order to sufficiently expect the above effects, the addition of Re in an amount of 3.5% or more is needed. However, Re is expensive, and its specific gravity is large and hence increases the specific gravity of the alloy.

If the additive amount exceeds 6%, needle like precipitate f the a-Re lowers creep rupture strength and toughness. Thus, he upper limit of Re is 6%. In considering the balance among he high temperature mechanical strength, corrosion resistance, structure stability at high temperatures, a preferable additive amount of Re is 3.3 to 5.5%, and a more preferable range is 3.3 to 5.2%.

[Ta: 4 to 8%]

Ta strengthens the alloy by dissolving in the γ' phase in the form of [$Ni_3$(Al, Ta, Ti)], resulting in the increase of creep rupture strength. In order to obtain the effect sufficiently, at least 4% is necessary. However, if the additive amount exceeds 8%, it becomes super-saturated to precipitate in the form of needle like d phase [Ni, Ta]. As a result, creep rupture strength is lowered. Accordingly, the upper limit is 8%. In considering the balance between the high temperature mechanical strength and structure stability, a preferable additive amount is 6.1 to 8%.

[Ti: 0.8 to 2%]

Ti solid-dissolves in the γ' phase in the form of [$Ni_3$(Al, Ta, Ti)], resulting in strengthening the alloy as same as Ta. The strengthening effect of Ti is not so much as Ta.

Since Ti has an effect to improve high temperature corrosion resistance, at least 0.8% is added. If the additive amount of Ti exceeds 2%, oxidation resistance becomes worse. Accordingly, the upper limit is 2%. In considering the balance among the high temperature mechanical strength, corrosion resistance and oxidation resistance, a preferable amount of Ti is 1 to 2%, and more preferably 1.2 to 1.8%.

[Al: 4.5 to 6.5%]

Al is an element for constituting the γ' phase [$Ni_3Al$] for strengthening the alloy. The phase improves the creep rupture strength. Further, Al contributes to improvement of oxidation resistance. In order sufficiently attain the effects, at least 4.5% is needed. If the additive amount exceeds 6.5%, the eutectic phase of the γ' phase [$Ni_3Al$] takes place to lower the mechanical strength of the alloy. Thus, the additive amount of Al is 4.5 to 6.5%.

[Ru: 0.1 to 6.0%]

Ru widens an area in which the γ' phase ($Ni_3Al$) solid-dissolves, thereby to make the solution treatment easy. Further, it solid-strengthens the γ phase and improves high temperature corrosion resistance. The effects appear if the additive amount exceeds 0.1%. However, Ru is expensive to increase a cost of the material. If the additive amount exceeds 6%, it reduces the precipitation of the γ' phase to lower the high temperature mechanical strength. Thus, the upper limit is 6%. In this range, a preferable amount is 0.2 to 4% in considering the balance among the easiness of solution treatment, mechanical strength and the cost.

[Hf: 0.01 to 0.2%]

Hf improves high temperature corrosion resistance and oxidation resistance by increasing adhesion of a protecting film (for example, $Cr_2O_3$, $Al_2O_3$) formed on the surface of the alloy. If an amount of Hf is too large, the adhesion of the protecting film is improved. However, if the amount exceeds 0.2%, the melting point of the nickel base superalloys is drastically lowered, so that a temperature range for the solution treatment will be narrowed. Thus, 0.2% or less is needed. In considering the balance among the corrosion resistance, oxidation resistance and a temperature range for heat treatment, a preferable additive range is 0.03 to 0.15%.

[Mo: less than 0.5%]

Mo has the function similar to W. A part of W is substituted with Mo, if necessary. Further, since it increases a solid solution temperature of the γ' phase, it has a function to increase the creep rupture strength. Since Mo has a smaller specific gravity than W, it is possible to reduce weight of the alloy. However, Mo lowers oxidation resistance and corrosion resistance, and hence the upper limit is less than 0.5%.

In considering the balance among the high temperature mechanical strength, corrosion resistance and high temperature oxidation resistance, a preferable range of Mo is 0.1% or less, and more preferably zero.

[Rare Earth Elements: 0.1 to 100 ppm]

Since the rare earth elements improve adhesion of a protecting film (for example, $Cr_2O_3$, $Al_2O_3$) on the surface of the alloy, it functions to improve high temperature oxidation resistance and corrosion resistance. In order to improve adhesion of the film to the alloy, an additive amount should be 0.1 ppm or more. If the additive amount of the rare earth elements exceeds 100 ppm, a melting point of the nickel base superalloys will be lowered, so that a solution treatment temperature range will be narrowed. It will also react with a casting molding to form oxides.

Accordingly, the amount should be 100 ppm or less. In considering the balance among corrosion resistance, oxidation resistance, reactivity with the casting mold and the heat treatment temperature range, a preferable range of the additive amount of rare earth element is 0.5 to 20 ppm. Though any rare earth elements have the function to improve adhesion, Ce and Y are preferable ones. Ce and Y are less expensive than other rare earth elements; they are practical additive elements.

[C:0.06% or less, B:0.01% or less Zr: 0.01% or less]

These elements are used for strengthening grain boundaries in the normal casting alloys and unidirectional solidification alloys. However, in the single crystal alloys, these elements are not necessary; amounts of the elements should be controlled for the following reasons.

C forms carbides (TiC, TaC, etc) and precipitates in the form of block. The carbides have melting points lower than that of the alloy. Since the solution treatment is conducted at a temperature immediately below the melting point of the alloy, the alloy that contains carbides may be partially melted. Thus, the temperature for the solution treatment is not increased. That is, the carbides narrow the temperature range of the solution treatment. Further, since C forms carbides with Ta, an effective amount of Ta, which is a solid-solution strengthening element, is decreased to lower the high temperature creep rupture strength. Thus, the upper limit of C is 0.06%.

B forms borides [$(Cr, Ni, Ti, Mo)_3B_2$] that deposit on the grain boundaries of the alloy. The borides have melting points lower than that of the alloy. Thus, the borides lower the solid-solution treatment temperature for the single crystal alloy. Therefore, the upper limit of B is 0.01%.

Zr forms intermetallic compounds with Ni. The compounds lower the melting point of the alloy and lower the solid-solution treatment temperature of the alloy. Thus, the upper limit of Zr is 0.01%.

[O: 0.005% or less, N: 0.005% or less]

These elements are brought into the ingot from raw alloy materials. O may be brought from a crucible, too. The elements are contained as oxides such as Al2O3, nitrides such as TiN AlN. If the single crystal alloy contains the compounds, the compounds may be starting points of cracks during creep deformation to shorten the creep rupture life. Thus, the upper limit of the elements is 0.005%.

The nickel base superalloys of the present invention are excellent in high temperature creep rupture strength, a high temperature corrosion resistance and oxidation resistance; the alloys are suitable for power plants such as jet engines, gas turbines for high performance and high efficiency.

DETAILED DESCRIPTION OF THE PREFERRED EMBODIMENTS

In the following, experimental results of creep rupture tests, oxidation tests and corrosion resistance tests of the nickel base alloys of the present invention are explained.

EXAMPLE 1

Tables 1 and 2 show compositions of the alloys Nos. A1 to A10, comparative alloys Nos. B1 to B10 and commercial alloys Nos. C1 to C6. Major components are shown in Table 1-1, Table 1-2 and Table 1-3, and the amounts of impurities in ingots prepared by melting are shown in Table 2-1, Table 2-2 and Table 2-3.

The alloys Nos. C2 and C3 are single crystals that have been in practical use, and the alloys No. C5 and C6 are unidirectional solidification alloys that have been in practical use.

TABLE 1-1

(Inventive alloys)

Alloying ingredients (Weight %)

| No. | Ti | Cr | Co | Ni | Mo | Hf | Ta | W | Re | Al | Ru | R.E.M. |
|---|---|---|---|---|---|---|---|---|---|---|---|---|
| A1 | 1.40 | 5.91 | 11.08 | Bal | — | 0.12 | 6.93 | 5.59 | 4.67 | 5.48 | 2.00 | — |
| A2 | 1.36 | 5.85 | 11.01 | Bal | — | 0.11 | 6.91 | 6.33 | 4.62 | 5.15 | 1.75 | — |

TABLE 1-1-continued (Inventive alloys)

Alloying ingredients (Weight %)

| No. | Ti | Cr | Co | Ni | Mo | Hf | Ta | W | Re | Al | Ru | R.E.M. |
|---|---|---|---|---|---|---|---|---|---|---|---|---|
| A3 | 1.43 | 5.00 | 10.07 | Bal | — | 0.12 | 6.88 | 6.45 | 4.80 | 5.42 | 1.95 | — |
| A4 | 1.42 | 5.80 | 11.00 | Bal | — | 0.12 | 6.83 | 6.12 | 4.78 | 5.46 | 1.43 | — |
| A5 | 1.46 | 6.12 | 10.88 | Bal | — | 0.12 | 6.94 | 6.11 | 4.72 | 5.38 | 0.62 | — |
| A6 | 1.38 | 6.04 | 11.00 | Bal | 0.22 | 0.11 | 6.81 | 5.56 | 4.48 | 5.28 | 0.41 | — |
| A7 | 1.40 | 6.03 | 10.78 | Bal | 0.41 | 0.12 | 6.76 | 6.02 | 4.88 | 5.40 | 3.55 | — |
| A8 | 1.38 | 5.87 | 11.13 | Bal | — | 0.12 | 7.05 | 5.94 | 4.73 | 5.44 | 1.14 | — |
| A9 | 1.43 | 6.45 | 11.11 | Bal | 0.38 | 0.12 | 6.77 | 6.11 | 4.89 | 5.35 | 4.63 | Ce 10 ppm |
| A10 | 1.40 | 5.98 | 10.88 | bal | — | 0.11 | 8.80 | 6.21 | 4.86 | 5.43 | 0.58 | Ce 5 ppm |

TABLE 1-2

(Comparative alloys)

Alloying ingredients (weight %)

| | Ti | Cr | Co | Ni | Mo | Hf | Ta | W | Re | Al | Ru | R.E.M. |
|---|---|---|---|---|---|---|---|---|---|---|---|---|
| B1 | 1.00 | 6.80 | 3.00 | Bal | 1.20 | 0.12 | 6.50 | 6.40 | 3.80 | 5.40 | — | — |
| B2 | 0.70 | 6.50 | 8.00 | Bal | 1.00 | 0.12 | 6.50 | 6.20 | 3.80 | 5.70 | — | — |
| B3 | 0.20 | 6.50 | 10.0 | Bal | 1.00 | 0.12 | 6.80 | 5.80 | 4.20 | 6.00 | — | — |
| B4 | 0.20 | 6.00 | 10.0 | Bal | 1.50 | 0.12 | 6.80 | 5.80 | 4.20 | 6.00 | — | — |
| B5 | 1.00 | 6.80 | 3.00 | Bal | 1.60 | 0.12 | 6.50 | 6.40 | 3.80 | 5.40 | — | — |
| B6 | 1.40 | 5.00 | 11.0 | Bal | 0.50 | 0.12 | 6.50 | 5.60 | 4.40 | 5.30 | — | — |
| B7 | 0.90 | 2.80 | 14.0 | Bal | 1.40 | 0.12 | 7.00 | 5.50 | 5.50 | 5.60 | — | — |
| B8 | 1.80 | 6.00 | 1.00 | Bal | 1.20 | 0.03 | 6.10 | 5.70 | 4.00 | 5.10 | — | — |
| B9 | 1.00 | 4.20 | 2.20 | Bal | 1.90 | 0.14 | 7.70 | 5.90 | 5.50 | 5.00 | — | — |
| B10 | 1.70 | 7.80 | 3.50 | Bal | 0.80 | — | 6.10 | 7.70 | 0.75 | 5.10 | — | — |

TABLE 1-3

(Commercial alloys)

Alloying ingredients (weight %)

| | Ti | Cr | Co | Ni | Mo | Hf | Ta | W | Re | Al | Ru | R.E.M. |
|---|---|---|---|---|---|---|---|---|---|---|---|---|
| C1 | 1.2 | 8.66 | — | Bal | 1.23 | — | 6.15 | 7.04 | 0.78 | 5.39 | — | — |
| C2 | 1.0 | 6.5 | 9.0 | Bal | 0.60 | 0.10 | 6.50 | 6.00 | 3.00 | 5.60 | — | — |
| C3 | — | 7.0 | 8.0 | Bal | 2.00 | 0.20 | 7.00 | 5.00 | 3.00 | 6.20 | — | — |
| C4 | — | 3.0 | 12. | Bal | 2.00 | 0.10 | 6.00 | 6.00 | 5.00 | 5.70 | — | — |
| C5 | 0.7 | 6.0 | 9.3 | Bal | 0.50 | 1.40 | 3.40 | 8.50 | 3.00 | 5.70 | — | — |
| C6 | 5.0 | 13.9 | 9.5 | Bal | 1.50 | — | 2.80 | 3.70 | — | 3.00 | — | — |

TABLE 2-1

(Inventive alloys)

Impurities (×10³ weight %; O, N: ppm)

| | C | Si | Mn | P | S | B | Zr | O | N |
|---|---|---|---|---|---|---|---|---|---|
| A1 | 1 | 2 | 1 | <1 | <1 | 0.4 | <1 | 6 | 6 |
| A2 | 2 | 6 | 1 | <1 | <1 | 0.9 | <1 | 8 | 5 |
| A3 | 2 | 2 | 1 | <1 | <1 | 0.6 | <1 | 6 | 8 |
| A4 | 1 | 4 | 1 | <1 | <1 | 0.7 | <1 | 8 | 4 |
| A5 | 1 | 2 | 1 | <1 | <1 | 0.6 | <1 | 6 | 11 |
| A6 | 3 | 3 | 1 | <1 | <1 | 1.1 | <1 | 4 | 9 |
| A7 | 1 | 3 | 1 | <1 | <1 | 0.13 | <1 | 7 | 5 |
| A8 | 1 | 2 | 1 | <1 | <1 | 1.1 | <1 | 6 | 6 |
| A9 | 2 | 2 | 1 | <1 | <1 | 0.6 | <1 | 8 | 7 |
| A10 | 2 | 5 | 1 | <1 | <1 | 0.5 | <1 | 8 | 5 |

TABLE 2-2

(Comparative alloys)

Impurities (×10³ weight %; O, N: ppm)

| | C | Si | Mn | P | S | B | Zr | O | N5 |
|---|---|---|---|---|---|---|---|---|---|
| B1 | 2 | 3 | 1 | <1 | <1 | 0.5 | <1 | 7 | 5 |
| B2 | 3 | 3 | 3 | <1 | <1 | 0.5 | <1 | 7 | 3 |
| B3 | 2 | 5 | 1 | <1 | <1 | 0.7 | <1 | 6 | 4 |
| B4 | 1 | 6 | 1 | <1 | <1 | 1 | <1 | 6 | 3 |
| B5 | 1 | 2 | 1 | <1 | <1 | 0.6 | <1 | 6 | 5 |
| B6 | 1 | 2 | 1 | <1 | <1 | 0.6 | <1 | 6 | 5 |
| B7 | 1 | 6 | <2 | <1 | <1 | 1 | 4 | 8 | 2 |
| B8 | 4 | 4 | <2 | <1 | 0.2 | 1.3 | <1 | 5 | 5 |
| B9 | 4 | <1 | <2 | <1 | 0.1 | 1.1 | <1 | 5 | 3 |
| B10 | 4 | 4 | <2 | <1 | 0.1 | <1 | <1 | 7 | 5 |

TABLE 2-3

(Commercial alloys)

Impurities (×10³ weight %; O, N: ppm)

| | C | Si | Mn | P | S | B | Zr | O | N |
|---|---|---|---|---|---|---|---|---|---|
| C1 | — | — | — | — | — | — | — | — | — |
| C2 | 2.5 | 11 | 3 | <5 | 0.3 | 2.5 | 1 | 2 | 1 |
| C3 | — | — | — | — | — | — | — | — | — |
| C4 | 1 | <100 | <50 | <3 | 0.3 | <2 | <10 | 5 | 3 |
| C5 | 70 | <100 | <10 | 0.2 | 0.1 | 15 | 7 | 2 | 2 |
| C6 | 100 | 20 | <10 | 2 | 6 | 14 | 21 | 16 | 3 |

At first, raw materials were prepared; then ingots of 200 m long were prepared, using a heat-resisting crucible of 15 kg capacity. Casting of test pieces of single crystals was prepared by unidirectional solidification casting of drawing a casting mold using the ingots. A ceramic mold of alumina was used. A casting mold temperature was 1540° C. A mold drawing speed was 20 cm/h, thereby to cast single crystal test pieces of a diameter of 15 mm and a length of 100 mm by a selector method. The casting was conducted in vacuum. The growing direction of the crystal was within 10° from <001>.

The cast single crystal test pieces were subjected to the solution treatment and aging treatments shown in Table 3. The heat treatment conditions were determined by observation of macro structure and microstructure in preparatory experiments.

By machining of the heat-treated single crystal test pieces, a creep rupture test piece of a parallel diameter of 6.0 mm and a parallel portion length of 30 mm, a high temperature oxidation resistance test piece of a length of 25 mm, a width of 10 mm and a thickness of 1.5 mm and a high temperature corrosion resistance test piece of a diameter of 8 mm and a length of 40 mm were prepared. Table 4 shows the test conditions for the test pieces. The creep rupture tests were conducted under 1040° C. -137 MPa and 920° C. -314 MPa. The high temperature oxidation tests were conducted by repeating under 1040° C. -600 hours. The weight change after 3000 hours was measured. The high temperature corrosion repetition tests were conducted by exposing the test pieces in a combustion gas containing 80 ppm of NaCl at 900° C. for 7 hours. After a 35 hours corrosion test, weight change of the test pieces was measured. The results are shown in the following tables.

TABLE 3-1

(Inventive alloys)

| | Solution treatment conditions | Aging conditions | |
|---|---|---|---|
| | | First aging | Second aging |
| A1-A10 | 1300 to 1325° C./4-30 h | 1140 to 1180° C./4 h, AC | 871° C./20 h, AC |

TABLE 3-2

(Comparative alloys)

| | Solution treatment conditions | First aging | Second aging |
|---|---|---|---|
| B1-B4 | 1300-1325° C./4-16 h | 1100-1120° C./4 h, AC | 871° C./20 h, AC |
| B5 | 1310° C./16 h + 1320° C./8 h | | |
| B6 | 1300-1320° C./4-16 h | 1160° C./4 h, AC | |

TABLE 3-2-continued (Comparative alloys)

| | Solution treatment conditions | First aging | Second aging |
|---|---|---|---|
| B7 | 1320° C./12 h + 1325° C./12 h + 1330° C./24 h | 1120° C./4 h, AC | |
| B8 | 1310° C./12 h + 1320° C./12 h + 1330° C./24 h + 1325° C./24 h | 1100° C./4 h, AC | |
| B9 | 1310° C./12 h + 1320° C./12 h + 1330° C./24 h + 1340° C./24 h + 1335° C./24 h | 1120° C./4 h, AC | |
| B10 | 1310° C./12 h + 1320° C./12 h | 1140° C./4 h, furnace cooling | |

TABLE 3-3

(Commercial alloys)

| | Solution treatment conditions | First aging | Second aging |
|---|---|---|---|
| C1 | 1320° C./5 h | 1050° C./16 h | 850° C./48 h |
| C2 | 1277° C./2 h + 1288° C./2 h + 1296° C./3 h + 1304° C./3 h + 1313° C./2 h + 1316° C./2 h + 1318° C./2 h + 1321° C./2 h | 1080° C./4 h, AC | 871° C./20 h, AC |
| C3 | 1310° C./2 h | | 900° C./16 h |
| C4 | 1300° C./1 h + 1320° C./5 h | 1150° C./4 h, AC | 871° C./20 h, AC |
| C5 | No treatment | 1080° C./4 h, AC | AC |
| C6 | 1121° C./2 h | 843° C./4 h, AC | No aging |

TABLE 4

| Names of tests | Contents of tests |
|---|---|
| Creep rupture test | Testing temperature and stress<br>(1) 1040° C.-137 MPa<br>(2) 920° C.-314 MPa |
| Oxidation test | Continuous oxidation test in air<br>(1) Temperature: 1040° C., time: 3000 h (600 h × 5 times) |
| Corrosion test | Corrosion test in high temperature gas<br>(1) temperature: 900° C., time: 35 h (7 h × 5 times)<br>(2) fuel: light oil, NaCl: 80 ppm |

In Tables 5-1, 5-2, 5-3, ⊚ represents very good, ○ represents good, Δ represents pit-holes, X represents bad, and X X represents very bad. In more concretely, ⊚ represents that no flows are observed with a visual examination and that any changes of external status are not observed after creep test, the oxidation test and the corrosion test. ○ represents that no flows are observed but color change is observed after the tests.

TABLE 5-1

(Inventive alloys)

| | Creep rupture time (h) | | Weight change after oxidation test (mg/cm2) | State after corrosion test | |
|---|---|---|---|---|---|
| | 1040° C./ 137 MPa | 920° C./ 314 MPa | +: weight increase −: weight loss | Weight change (mg/cm2) | External appearance |
| A1 | 1301.6 | 1554.9 | −15.306 | −0.473 | ⊚ |
| A2 | 1495.4 | 1803.6 | −20.611 | −0.381 | ⊚ |

TABLE 5-1-continued (Inventive alloys)

| | Creep rupture time (h) | | Weight change after oxidation test (mg/cm2) +: weight increase -: weight loss | State after corrosion test | |
|---|---|---|---|---|---|
| | 1040° C./ 137 MPa | 920° C./ 314 Mpa | | Weight change (mg/cm2) | External appearance |
| A3 | 1455.4 | 1838.0 | −37.008 | −0.434 | ⊚ |
| A4 | 1562.1 | 1635.4 | −13.258 | −0.562 | ○ |
| A5 | 1621.0 | 1722.9 | −10.701 | −0.123 | ⊚ |
| A6 | 1320.5 | 1432.0 | −22.301 | −0.138 | ⊚ |
| A7 | 1833.0 | 1565.8 | −33.289 | −0.876 | ○ |
| A8 | 1330.5 | 1291.5 | −16.154 | −0.652 | ○ |
| A9 | 1166.3 | 1774.8 | −1.338 | −0.562 | ⊚ |
| A10 | 1553.7 | 1623.4 | −2.115 | −0.663 | ⊚ |

TABLE 5-2

(Comparative alloys)

| | Creep rupture time (h) | | Weight change after oxidation test (mg/cm²) +: weight increase -: weight loss | Status after corrosion test +: weight increase -: weight loss | |
|---|---|---|---|---|---|
| | 1040° C./ 137 MPa | 920° C./ 314 MPa | | Weight change (mg/cm²) | External appearance |
| B1 | 553.5 | 487.2 | −10.182 | −0.053 | ○ |
| B2 | 345.8 | 629.8 | −12.068 | 20.076 | XX |
| B3 | 257.8 | 481.7 | −5.967 | −0.461 | Δ |
| B4 | 251.0 | 583.2 | −10.512 | −0.212 | Δ |
| B5 | 437.3 | 407.7 | −11.835 | −0.607 | Δ |
| B6 | 1010.6 | 967.2 | −48.198 | −0.211 | Δ |
| B7 | 1165.1 | 1458.2 | −145.851 | 11.501 | X |
| B8 | 345.0 | 320.4 | −7.636 | 1.060 | ○ |
| B9 | 287.5 | — | −46.165 | 0.517 | ○ |
| B10 | 116.4 | 81.1 | −18.777 | −7.716 | XX |

TABLE 5-3

(Commercial alloys)

| | Creep rupture time (h) | | Weight change after oxidation test (mg/cm²) +: weight increase -: weight loss | State after corrosion test +: weight increase -: weight loss | |
|---|---|---|---|---|---|
| | 1040° C./ 137 Mpa | 920° C./ 314 MPa | | Weight change (mg/cm²) | External appearance |
| C1 | 936 | — | — | −66.534 | XX |
| C2 | 726.0 | 750.0 | −16.694 | 0.807 | XX |
| C3 | 720.0 | — | — | — | — |
| C4 | 1260.0 | 1655.0 | −67.584 | 11.501 | Δ |
| C5 | 192.0 | — | −1.207 | 13.133 | X |
| C6 | 42.6 | — | −54.116 | −81.939 | XX |

As is apparent from the results shown in Table 5, the alloy Nos. A1 to A10 exhibited remarkably small corrosion weight, and drastically improved creep rupture life, compared to the unidirectional solidification alloy Nos. C5 and C6. Further, though the oxidation weight loss and corrosion weight loss of the alloys of the present invention are almost the same as those of the single crystal alloy C2, the creep rupture life was remarkably improved.

The alloys of the present invention exhibit improved mechanical strength and corrosion resistance, compared to the commercial single crystal alloy No. C1, and improved creep rupture strength, compared to the commercial single crystal alloy No. C3. Further, the creep rupture strength of the alloys of the present invention is rather better than the commercial single crystal alloy No. C4 and oxidation resistance and corrosion resistance are remarkably improved compared to the commercial single crystal alloy No. C4. The alloys of the present invention are well-balanced alloys in various properties.

When the alloys of the present invention contain a small amount of Ce, the oxidation resistance was greatly improved as is apparent from alloy Nos. A9 to A10, without scarificing the creep rupture strength and corrosion resistance. It has been revealed that addition of Ce was effective for improving high temperature oxidation resistance of the alloys of the present invention.

As has been discussed, the alloys of the present invention are excellent in high temperature creep rupture strength, high temperature corrosion resistance and oxidation resistance, which are well-balanced alloys. On the other hand, some of the alloys Nos. B1 to B10 whose compositions are outside of the composition of the present invention are poor in creep rupture life, and high temperature oxidation resistance and corrosion resistance are poor, which are not balanced among the properties.

The comparative alloys Nos. B1 to B5 and B8 to B10 are rather good in corrosion resistance and oxidation resistance, but are very poor in creep rupture strength. Although the comparative alloys Nos. B6 and B7 have almost the same creep rupture strength as of the alloys of the present invention, high temperature corrosion resistance and oxidation resistance are poor. The nickel based superalloys of the present invention may be applied to power plants such as jet engines, gas turbines, etc, which require high creep rupture strength, good high temperature corrosion resistance and high temperature oxidation resistance to meet the elevated temperature of the power plants.

A creep rupture time of the nickel based superalloys of the present invention is 1,000 hours or more under 1040° C. /137 MPa, preferably 1100 hours or more and 1,200 hours or more under 920° C./314 MPa, more preferably 1,500 hours or more under 920°/314 MPa.

An oxidation weight change of the nickel based superalloys of the present invention is 40 mg/cm² or less, preferably 30 mg/cm².

A corrosion weight change of the nickel based superalloys of the present invention is 2 mg/cm² or less, preferably 1 mg/cm².

What is claimed is:

1. A nickel based superalloy, which consists of chromium in an amount of 3.8 to 6.8% by weight, cobalt in an amount of 10.1 to 12.5% by weight, tungsten in an amount of 4.8 to 7% by weight, rhenium in an amount of 3.3 to 5.2% by weight, tantalum in an amount of 6.1 to 8% by weight, titanium in an amount of 1.2 to 1.8% by weight, aluminum in an amount of 4.5 to 6.5% by weight, ruthenium in an amount of 0.1 to 6% by weight, hafnium in an amount of 0.03 to 0.15% by weight, molybdenum in an amount of less than 0.5% by weight, carbon in an amount of 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel, and wherein said nickel based superalloy is a nickel based single crystal superalloy, and wherein said nickel based single crystal superalloy has excellent mechanical strength, corrosion resistance and oxidation resistance.

2. The nickel based superalloy according to claim 1, which consists of chromium in an amount of 3.8 to 6.8% by weight, cobalt in an amount of 10.1 to 12.5% by weight, tungsten in an amount of 4.8 to 7% by weight, rhenium in an amount of 3.3 to 5.2% by weight, tantalum in an amount of 6.1 to 8% by weight, titanium in an amount of 1.2 to 1.8% by weight, aluminum in an amount of 4.5 to 6.5% by weight ruthenium in an amount of 0.1 to 6% by weight, hafnium in an amount of 0.03 to 0.15% by weight, molybdenum in an amount of less than 0.1% by weight, carbon in an amount of 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel.

3. The nickel based superalloy according to claim 1, which consists of chromium in an amount of 3.8 to 6.8% by weight cobalt in an amount of 10.1 to 12.5% by weight, tungsten in an amount of 4.8 to 7% by weight, rhenium in an amount of 3.3 to 5.2% by weight, tantalum in an amount of 6.1 to 8% by weight, titanium in an amount of 1.2 to 1.8% by weight, aluminum in an amount of 4.5 to 6.5% by weight, ruthenium in an amount of 0.2 to 4% by weight, hathium in an amount of 0.03 to 0.15% by weight, molybdenum in an amount of less than 0.1% by weight, carbon in an amount of 0.06% by weight or less, boron in an amount of 0.01% by weight or less, zirconium in an amount of 0.01% by weight or less, oxygen in an amount of 0.005% by weight or less, nitrogen in an amount of 0.005% by weight or less and inevitable impurities and the balance being nickel.

4. The nickel based superalloy according to claim 1, wherein the matrix is a single crystal of the γ-phase, in which the γ' phase precipitates.

5. The nickel based superalloy according to claim 2, wherein the matrix is a single crystal of the γ-phase, in which the γ' phase precipitates.

6. The nickel based superalloy according to claim 3, wherein the matrix is a single crystal of the γ-phase, in which the γ' phase precipitates.

7. The nickel based superalloy according to claim 1, wherein the superalloy has a long creep rupture time.

8. The nickel based superalloy according to claim 1, wherein a Co/Cr ratio by weight % is 1.722 to 2.014.

9. The nickel based superalloy according to claim 1, wherein a creep rupture time is 1291.5 to 1838.0 hours under temperature and pressure conditions of 920° C. and 314 MPa, or 1163.0 to 1833.0 hours under temperature and pressure conditions of 1040° C. and 137 MPa.

10. The nickel based superalloy according to claim 1, wherein an amount of ruthenium is 0.41 to 4.63% by weight.

11. The nickel based superalloy according to claim 2, wherein an amount of ruthenium is 0.41 to 4.63% by weight.

* * * * *

UNITED STATES PATENT AND TRADEMARK OFFICE
CERTIFICATE OF CORRECTION

PATENT NO. : 7,597,843 B2 Page 1 of 1
APPLICATION NO. : 11/212644
DATED : October 6, 2009
INVENTOR(S) : Yoshinari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 95 days.

Signed and Sealed this

Twenty-eighth Day of September, 2010

David J. Kappos
*Director of the United States Patent and Trademark Office*